(No Model.)
D. D. NOLLEY.
PAPER BAG AND TWINE HOLDER.
No. 428,936. Patented May 27, 1890.
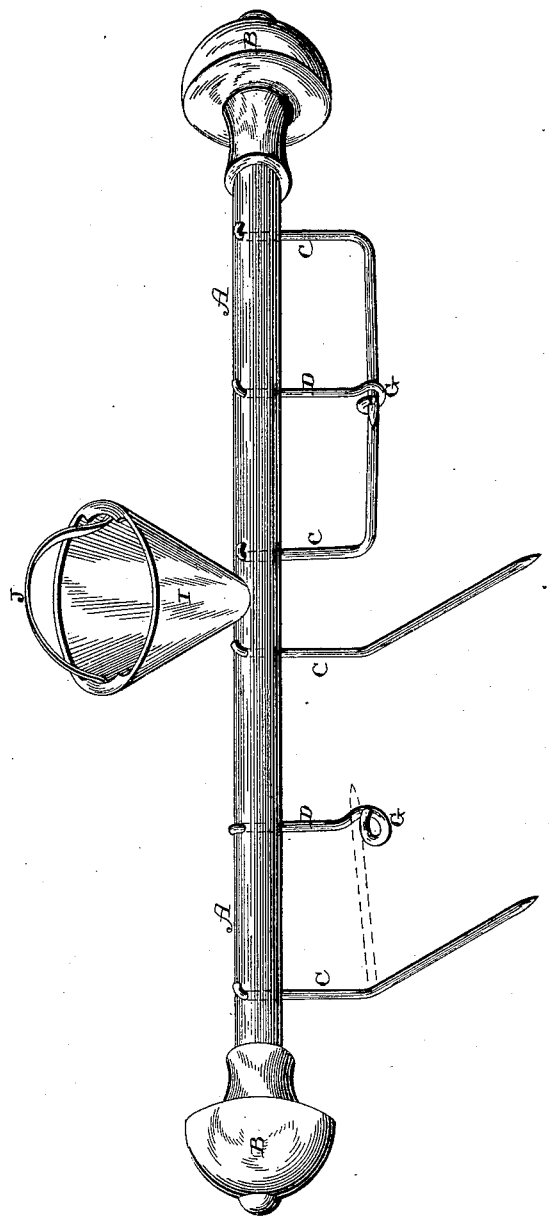
Witnesses:
E. P. Ellis
B. Brockett
Inventor:
D. D. Nolley,
per
J. A. Lehmann,
atty.

UNITED STATES PATENT OFFICE.

DAVID D. NOLLEY, OF WILSON, NORTH CAROLINA.

PAPER-BAG AND TWINE HOLDER.

SPECIFICATION forming part of Letters Patent No. 428,936, dated May 27, 1890.

Application filed January 31, 1890. Serial No. 338,807. (No model.)

*To all whom it may concern:*

Be it known that I, DAVID D. NOLLEY, of Wilson, in the county of Wilson and State of North Carolina, have invented certain new and useful Improvements in Paper-Bag and Twine Holders; and I do hereby declare the following to be a full, clear, and exact description of the invention, such as will enable others skilled in the art to which it pertains to make and use it, reference being had to the accompanying drawing, which forms part of this specification.

My invention relates to an improvement in paper-bag and twine holders; and it consists in the combination and arrangement of parts to be fully described hereinafter, and pointed out in the claims.

The object of my invention is to produce a combined paper-bag and twine holder, in which the ends of two of the wires which hold the bags are held in a single hook or catch which has a partially-turning movement.

The accompanying drawing represents a perspective of a device which embodies my invention.

A represents a rod of any suitable length or thickness, and which is provided with suitable ornaments B, of any desired description at its ends. This rod is intended to be hung up above the counter, or in any other convenient place. Passed down through this rod are a suitable number of L-shaped wires C, which have a turning movement in relation to the rod, and which have their lower ends sharpened, so as to pass readily through the paper bags of different sizes, which are to be placed upon the horizontal portions of the wire. These wires C are preferably arranged in pairs, and after they have been filled with bags of the desired sizes their sharpened ends or points are turned inwardly toward each other and then supported and locked in position by means of a vertical wire D, which is provided with a hook or bend G at its lower end. This wire has a partially-turning movement, so that the opening into the hook can be brought into line with the two wires C, and thus allow their ends to be raised out of the hook. This wire serves both to support the wires after they have been filled with bags and to lock them into position, so that they will remain in a line with the rod A. By using only a single wire D two wires C are supported and locked in position by means of a single fastening. When it is desired to loosen one of the wires C to turn it, so that its lower portion will extend at an angle with the rod A, the wire D must be partially revolved, so as to bring the opening of the hook G just above the free ends of the wires C. After the wires have been filled with bags they are turned into line again with the rod A, their ends are lifted up so as to pass over the top of the hook, and then the rod D is turned partially around, so that the bent upper end of the hook will catch over the tops of the two wires and lock them in position, as shown.

At the center of the rod A, a vertical opening is made, and down through which the lower end of the conical twine-holder I is passed. This holder I is made conical, so that the ball of twine cannot revolve or turn in the holder while the twine is being drawn out. The ball of twine is held in the holder by means of a spring J, which has its ends to engage with the top of the holder in any suitable manner. This spring prevents the twine from falling out should the holder be turned over to one side by accident at any time.

Having thus described my invention, I claim—

1. The combination, with the rod of the L-shaped wires, having their vertical portions passing through the said rod and adapted to be turned and their ends to lap, of a vertical wire midway between the L-shaped wires, which passes through the said rod and its lower end formed into substantially a complete circle, the end of the wire being separated from the vertical portion, so as to allow the wires to pass into the circle when it is turned in a line parallel with the rod, and to lock the wires when turned at an angle to the rod, substantially as described.

2. The combination, with the rod carrying a bag-holder and having a vertical opening, of a conical twine-holder having its reduced end secured to the rod at the opening, whereby the twine passes through the said opening, substantially as shown and described.

In testimony whereof I affix my signature in presence of two witnesses.

DAVID D. NOLLEY.

Witnesses:
J. R. RAWLS,
MAX HARRIS.